PRIORITY SELECTOR SIGNALLING DEVICE

Filed July 7, 1967

INVENTOR
ROBERT L. ADAMS JR.

BY Earl C. Hancock
ATTORNEY

Nov. 24, 1970 R. L. ADAMS, JR 3,543,246

PRIORITY SELECTOR SIGNALLING DEVICE

Filed July 7, 1967

2 Sheets-Sheet 2

United States Patent Office 3,543,246
Patented Nov. 24, 1970

3,543,246
PRIORITY SELECTOR SIGNALLING DEVICE

Robert L. Adams, Jr., Kingston, N.Y., assignor to International Business Machines Corporation, Armonk, N.Y., a corporation of New York Filed July 7, 1967, Ser. No. 651,775
Int. Cl. G06f 9/18
U.S. Cl. 340—172.5 4 Claims

ABSTRACT OF THE DISCLOSURE

In a device for determining which of a plurality of service request type input signals will be honored, the time during which the winner is to be determined is overlapped with the time during which the contesting signals are permitted to enter competition. The appearance of a first signal representative of a service request initiates operation of the circuitry which will perform a concurrent timeout and decision making operation. Later occurring but higher priority signals which are permitted to compete will degate lower priority timeout circuits.

CROSS REFERENCE TO RELATED APPLICATION

Application Ser. No. 651,739, "Multiple Level Priority System" by Robert L. Adams and Gerald W. Kurtz, filed concurrently with this application and having the same assignee as this application.

BACKGROUND OF THE INVENTION

(a) Field of the invention

The present invention relates to circuitry for determining which of a plurality of input signals will be serviced. More particularly, the present invention relates to electronic circuits for determining the time within which any of a multiplicity of service request type input signals will be permitted to complete and which further overlaps this competition time determining function with the decision making function for determining which of the service requests will be honored. The present invention is particularly useful in a computer environment wherein a plurality of devices must be serviced by a common device. For instance, in a multiprocessor configuration or a multi-element configuration wherein a plurality of processor units and a plurality of communication channel type units are competing for assignment of a storage cycle by a storage unit, the present invention permits the determining of the time during which competition will be allowed to overlap with the time during which the winner of the cycle awarding will be determined.

(b) DESCRIPTION OF THE PRIOR ART

In any system configuration wherein a multiplicity of service request type signals must be honored, several functions must be performed before the decision to award priority is completed. In some prior art systems, the appearance of a service request signal initiated a scan of a plurality of indicators in sequence until it located the first indicator showing a request. This request was then honored and the device was returned to a reset condition so that a new scan cycle would be initiated starting once again at the first indicator if there were any unanswered requests remaining or if any further requests appeared. By this system, a high priority user with an indicator that hapened to be physically located at a preferred location in the physical arrangement of the indicators could pre-empt any other service request.

In another type device, the appearance of any service request would cause a scan indicating the storage of any service request and would continuously cycle from the last serviced indicator. This type device entailed a considerable loss of time since a device having a relatively high position in the list of indicators which hapened to have two consecutive service request signals with no other signals present would be delayed until all indicators had been scanned and the cycle had returned to that initial request indicator.

In every prior art system which is intended to ensure that all requests will be honored on a reasonable time basis, two fundamental decisions are involved. First, it had to determine what period of time would be allowed for the entry of signals to be permitted to compete—a period sometimes referred to as the "scan window"— and second it had to determine which of the competing signals would be awarded priority. In a system such as is shown in the copending application mentioned in paragraph II above, it has been known to initiate the closing of the window whenever the first request is present and the common device is available. After this window has been permitted to close which is generally a function of the circuit delays required to decondition input circuitry, the priority circuitry for awarding service to the winner is then permitted to perform its function. The timing circuitry associated with this arrangement must wait a sufficient length of time to permit all circuits to stabilize before it will gate the final decision from the logic circuitry determining the winner to start the servicing of the winning request. When such a system is utilized with a storage unit, the necessary time to allow for a fixed scan unfortunately results in wasting of time during which the storage unit could be accessed and constructively utilized. That is, the entire computing system is delayed until the window is determined and sufficient time is allowed to pass to ensure that the decision as to the winner has been made.

BRIEF SUMMARY OF THE INVENTION

By means of the present invention, the first of a multiplicity of service request type input signals which is to be permitted to compete for assignment of serving initiates the circuitry for closing the scan window which is the time during which the appearing signals will be permitted to complete. The circuitry begins a logic timeout function which besides initiating the defining of the scan window, further initiates interconnected priority awarding functions. Each competing input signal has a separate channel associated therewith and the initial such signal will cause the commencement of deconditioning of input circuitry for determining the width of the scan window. In addition, by means of two generally parallel paths, signals are permitted to commence a timeout type function which, if the particular signal will ultimately be the winner of the competition for honoring of a request, will degate all other signal channels so that they cannot produce an output signal indicating that they are the winner despite the fact that the degated channels may actually be conpeting in the same scan window. The winning channel will timeout such that a signal will indicate that it is the winner and will also complete the conditioning of an AND type circuit to initiate the subsequent circuitry that actually performs the honoring of the service request. By the present invention, the time span from appearance of a request until the commencement of actual servicing of the request is kept to a minimum thereby permitting more time to be available for usage of the commonly shared devices.

Accordingly, it is an object of the present invention to provide circuitry wherein the definition of the scan window and the determination of the scan winner are concurrently performed.

Another object of the present invention is to provide circuitry wherein the minimum time delay between the initial appearance of a service request and the final awarding of servicing to that winning request is minimized.

Yet another object of the present invention is to provide scan window defining and winner determining circuitry which is interconnected so that the winner of a competition for honoring of a service request is not necessarily the same signal as the one which initiates the determination of the width of the scan window.

The foregoing and other objects, features and advantages of the present invention will be more apparent from the following more particular description of the preferred embodiment as is illustrated in the accompanying drawings in which.

DESCRIPTION OF THE PREFERRED EMBODIMENT

Many operations performed in accordance with the present invention and the following description are directly related to operations discussed in the copending application referenced hereinabove in paragraph II. Thus, any mention hereinafter of the "referenced application" will mean the aforementioned copending application. Although the following detailed description is in terms of a common storage unit which services a plurality of devices such as processor elements and/or communication channel control units, the invention is not necessarily so limited.

Figure 1:
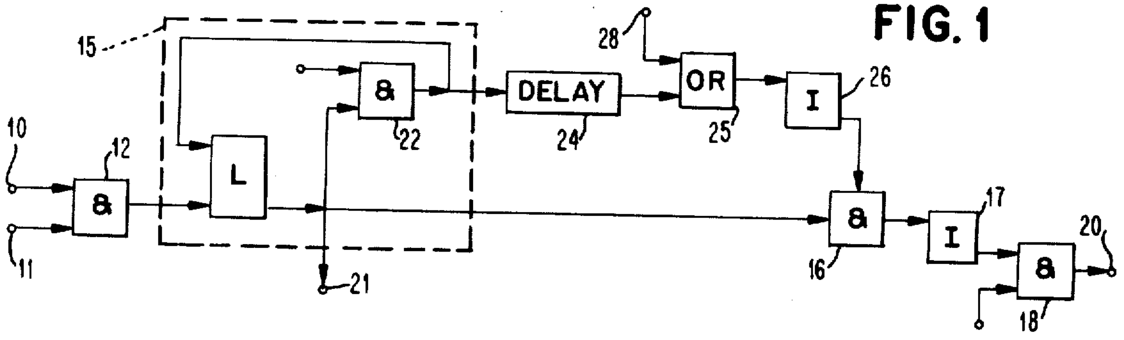
FIG. 1 is a broad block diagram of one channel which could process a service request type input signal in accordance with the present invention.

Referring to FIG. 1, a signal representing an appearance of a service request type input signal will be introduced to terminal 10. If the shared common device (not shown) is available for servicing a request input, a signal will subsequently appear on input terminal 11 from the common device. This will result in the complete conditioning of the input gate represented by AND circuit 12, this being analogous to the AND circuits 41–43 and 61, 65 and 66 of the referenced application. These signals will set a latch shown in dotted circuitry as 15 which is the equivalent of the scan latches 40 and 62 also shown in the referenced application.

The appearance of any signal for the purpose of setting scan latch 15 will start the processing chain for that particular service request regardless of the time that the signal appears. If however a higher priority input arrives prior to window closing time, the time at which all circuits equivalent to AND 12 are conditioned by the removal of the signal at 11, it will cause the progression of the lower priority user to be blocked. Typically, the scan window would be opened for three time periods, usually three circuit delays, from the time at which both the common device to be shared is available and the appearance of the first request type signal. The scan latch 15 in each channel is set in a manner analogous to the referenced application. The output of the set side of scan latch 15 performs three functions. The first is to cause AND circuit 16 through invert circuit 17 to inhibit the AND circuit 18. Thus, the output of AND 18 at terminal 20 would be a signal indicating that the memory should be started. The hardware thus described is for the purpose of preventing memory from being started unit a contestant has been picked as a winner.

A second path from latch 15 is for the purpose of degating lower priority users and this is the signal which is produced at terminal 21. The third function performed by the circuitry is basically that of a timeout function which includes the logical path through AND circuit 22, delay circuit 24, the degating OR circuit 25 and invert circuit 26. AND 22 is for the purpose of a reset AND as part of latch 15 and delay 24 is included to permit the timing of the circuitry. OR 25 provides an output with either an input from a higher priority degate circuitry at terminal 28 or will produce an output when its own scan latch 15 has provided an input. This through invert 26 causes the inhibit AND 16 to condition its input into start memory AND 18. That is, it removes its inhibit thereby permitting the memory to be started when the user that caused the degate completes its timeout. If the user who initiated the operation of the circuitry shown in FIG. 1 is to be the winner, a signal will be also produced concurrently with the output of a signal at 20 as will be appreciated from the following description of FIG. 2.

Figure 2:
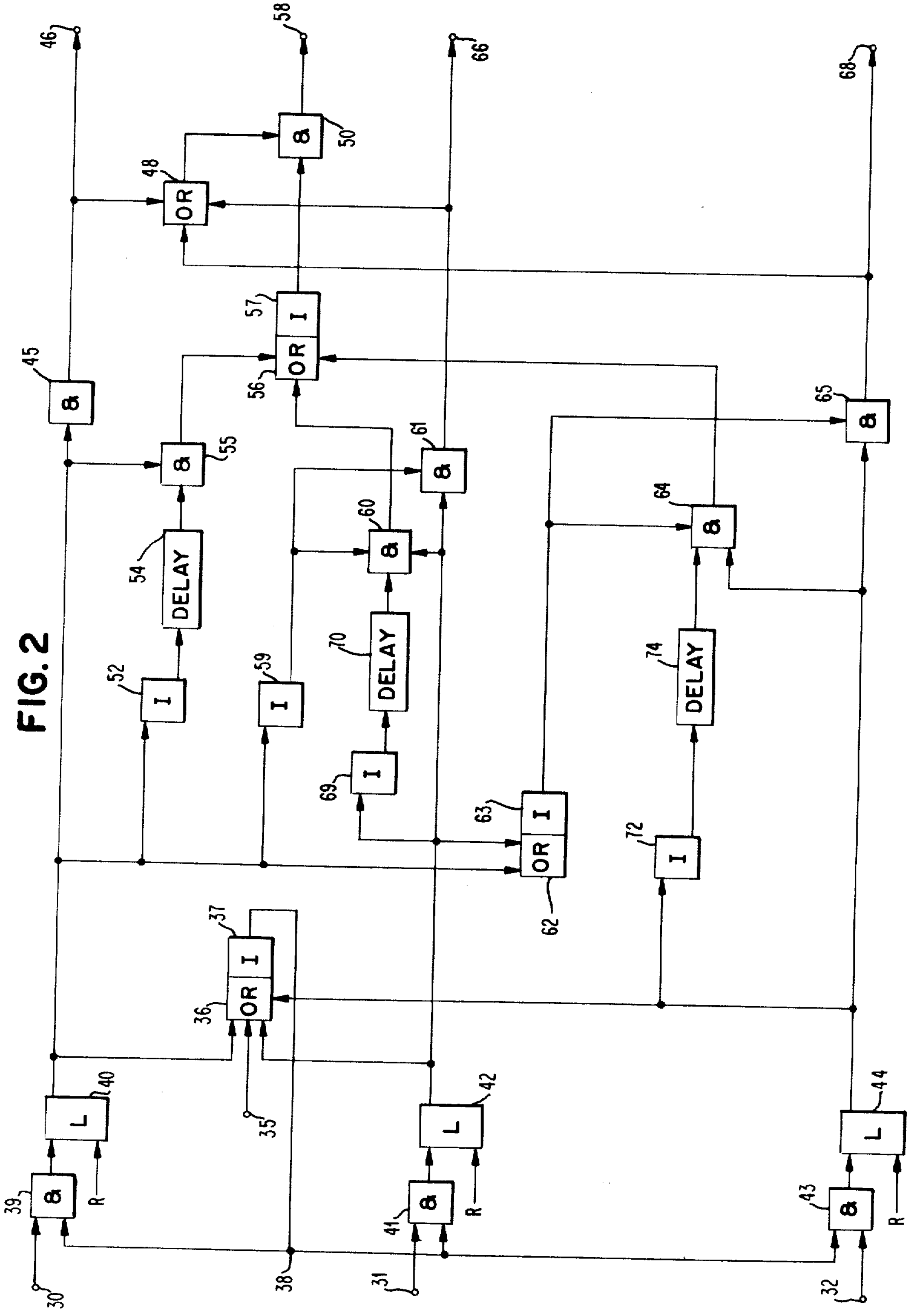
FIG. 2 illustrates typical positive logic circuitry of the present invention illustrating the manner in which three service request type input signals are permitted to compete in accordance with the present invention.

FIG. 2 shows in positive logic block form the circuitry in accordance with the present invention for defining the scan window and awarding priority amongst any of three service request type iput signals. The input signals introduced to terminals 30, 31 and 32 in conjunction with the circuitry shown in the referenced application, would be the inputs to AND circuits 41–43, 61, 65 and 66 in the referenced application. As long as the memory is not available, a signal would be introduced to terminal 35 which, through OR 36 and invert 37 circuitry, would decondition AND 39 and its counterparts. However, when the signal is introduced to 30 and a conditioning signal is present for AND 39 (i.e.: the memory is not busy and there has been no other deconditioning event), latch 40 will be set. Latch 40, the scan latch for the first user, is analogous to latch 40 in the referenced application. The setting of latch 40 will produce an output signal which also will be passed through OR 36 and invert 37 and will decondition AND 39 as well as ANDs 41 and 43 thus blocking any signals which have not been passed to scan latches 42 and 44. The circuitry of FIG. 2 is such that any competition between input signals 30, 31 and 32 which result in the setting of scan latches 40, 42 and 44 will result in priority being awarded first to user 30, second to user 31 and finally to user 32. It should be appreciated that the mere setting of a latch such as 40 does not instantaneously decondition ANDs 39, 41 and 43 and therefore latches 42 and 44 could be set before an output can be produced at terminal 38 to decondition the appropriate AND circuits.

In any event, the first latch which is set of scan latches 40, 42 and 44 will initiate the circuit action that will decondition the input AND circuits 39, 41 and 43 and begin the closing of the scan window. AND circuit 45 is included in the first channel but would be continuously conditioned since it is to have the highest priority. However, if it were to be of a lower priority, AND 45 would have another input to operate substantially in accordance with the manner in which AND circuits 61 and 65 for users 31 and 32 are operated as will be discussed hereinafter. The presence of a signal at output terminal 46 indicates to the memory control circuitry that the user represented by the input signal at terminal 30 is to be serviced. The setting of latch 40 also deconditions the other channels for the other users as will be understood hereinafter.

The fact that an output signal is produced by AND 45 will provide an input to OR 48 which will partially condition AND 50. Subsequently, the signal which is introduced by the set output of 40 will be passed through invert circuit 52 into delay circuit 54 to complete the conditioning of AND circuit 55. The purpose of the delay circuit 54 is to ensure that sufficient time in decision making is allowed so that all possible winning contenders in the scan window are given an opportunity to compete. That is, the main purpose of delay 54 is to ensure that the circuitry has completely stabilized before the final decision as to the winner is generated. However, once an output is produced by AND 55 to provide an input for OR circuit 56, a signal will be produced from invert 57 to complete the conditioning of AND 50 and thus produce an output on terminal 58 which is in essence a "start memory" signal. Thus, the memory control circuitry would recognize the presence of a signal on both terminals 46 and 58 as an indication that the next storage cycle is to be granted to the user corresponding to the input at terminal 30 and that the acceptance of this memory cycle is to be commenced.

The set output from latch 40 also provides degating signals to the lower priority user channels. For instance, the signal is passed through invert 59 to decondition AND circuits 60 and 61 for the user represented by input 31. The set output of latch 40 is additionally coupled to provide an input to OR circuit 62 and invert circuit 63 to decondition AND circuits 64 and 65 for the user represented by input 32. Thus, if an input signal had been introduced to terminal 30 at the same time as the signal was introduced to both terminals 31 and 32, the output of scan latch 40 would decondition the timeout function of the channels for 31 and 32 to block the production of signals at terminals 66 and 68 to prevent the memory control circuitry from recognizing either of the lower priority units as the winner.

Although the circuitry in FIG. 2 for simplicity of the description shows a contest between only three input signals, it is to be appreciated that the present invention would be equally applicable to a contest between only two users or between any number of users.

If the scan window was initially started by an input signal at terminal 31, AND circuit 61 would be initially conditioned and produce an output at terminal 66. However, before the output signal from scan latch 42 could pass through invert circuitry 69 and delay circuitry 70 to complete the conditioning of AND 50 and start the memory, the circuitry for the channel associated with input signal 30 would have sufficient opportunity to decondition AND 60 and AND 61 and thus ensure that the priority would be awarded on the basis of signals at terminals 46 and 58. Analogous operations are performed for the user represented by the input signal at 32 through invert 72 and delay 74 except that this circuitry can also be blocked by the setting of scan latch 42 as well as by the output of latch 40.

When an input signal is received at any of latches 40, 42 or 44, that latch will begin to switch. However, there is a period of time during which the latch and the gating circuitry associated therewith (i.e.: ANDs 45, 55, 61 and 65 for latch 40) is not yet stabilized, this circumstance being applicable to a latch receiving an input subsequent to an initial input to another latch but prior to deconditioning of input ANDs 39, 41 and 43 which deconditioning is the closing of the scan window. It is only necessary to wait a sufficient period of time to ensure that this later set latch and all switching circuitry associated therewith can stabilize and then only if no other higher priority latch is competing before the winner can be identified. Thus, the purpose is to only wait tht actual period of time needed for the winner to complete his switching as against waiting for the possible occurrence of other competing signals.

Figure 3:
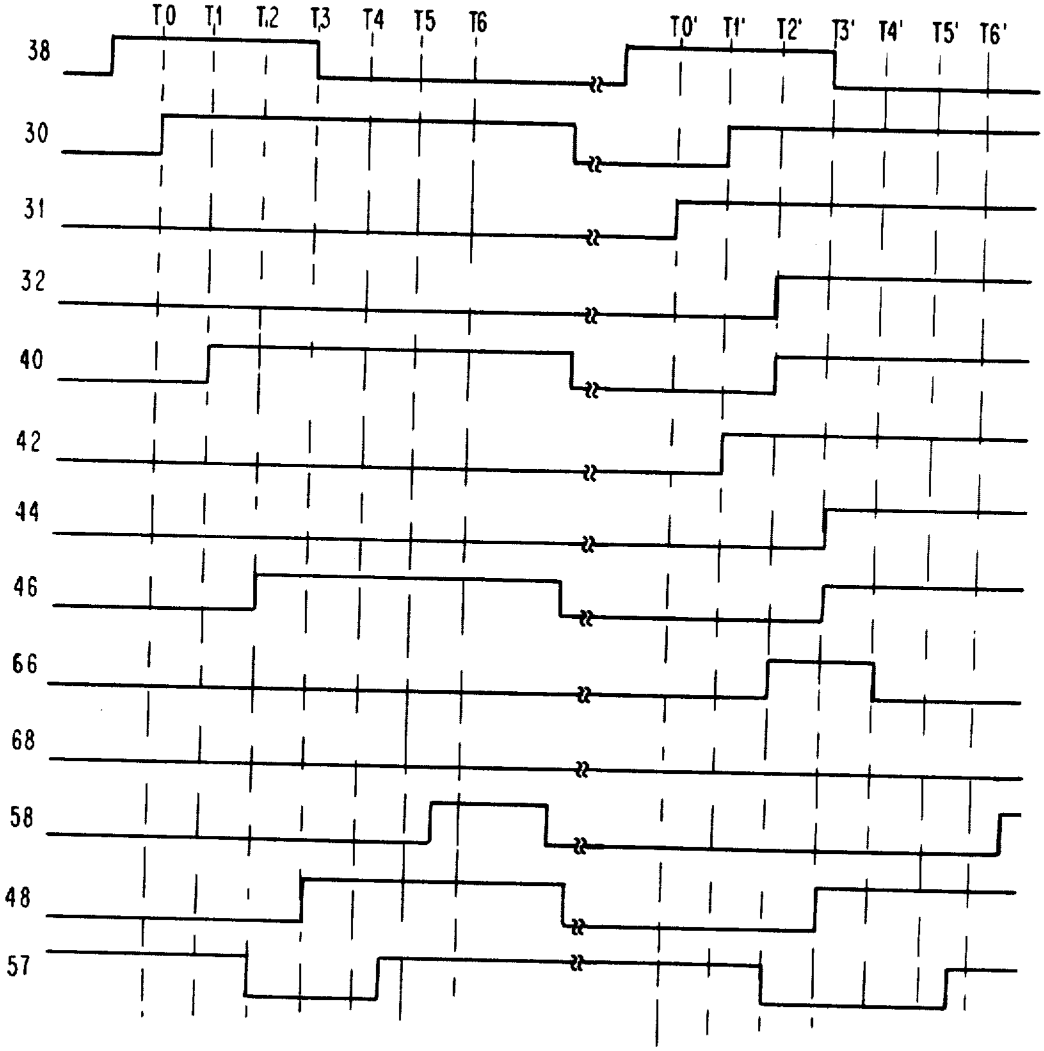
FIG. 3 is a somewhat idealized time base diagram of some typical operations of the FIG. 2 circuitry.

The operation of the FIG. 2 will now be described with respect to the time base diagram illustrated in FIG. 3 wherein the numbers in the left hand column correspond to similarly numbered blocks or circuit points in FIG. 2. Prior to time T0, a signal is introduced to terminal 35 indicating that the memory is available which results in the raising of the level at circuit point 38. The raising of the line at point 38 conditions AND circuits 39, 41 and 43 so that the arrival of a request signal at terminal 30 at time T0 is gated to scan latch 40 which is then set. Approximately one circuit delay later, a signal appears on line 46 which would indicate that the user associated with terminal 30 should be accepted. At approximately the same time, the output of invert circuit 57 will drop thereby deconditioning AND 50 and thus prevent AND 50 from producing an output even when the subsequently occurring output from OR 48 raises at T3. Accordingly, no "start memory" signal will be produced at terminal 58 from the output of AND 50 for the time being. However, after the signal passes through invert 52, delay 54 and AND 55, invert 57 will produce a signal level at a time subsequent to T4 thus completing the conditioning of AND 50. Accordingly, one circuit delay later, the level will be produced at terminal 58 which indicates to the memory control circuitry that a winner has been determined and the scan completed so that a storage cycle can now be granted. The combination of a signal at both terminal 46 signal and terminal 58 indicates to the control circuitry that the memory cycle is to be started and is to be awarded to the user associated with input terminal 30.

It should be noted that the time indicated for each space between time T0, T1, etc., is incremented in the approximate time delay associated with the passage of a signal through a given circuit. However, it should be understood that this timing relation is somewhat idealized and, for instance, only three time delays are associated with the appearance of the signal at 30 and the deconditioning of circuit point 38 since the practical circuitry for AND 39 and latch 40 results in only one circuit delay as such. The time span between the initial appearance of a signal at T0 and the production of the signal at 58 is between five and six increments. This is considerably less than would be required if external timing had to be arranged to allow for all circuits to stabilize before deciding which competing input is the winner.

After the request represented by the signal at terminal 30 has been processed, the scan latch is reset and the circuit is conditioned to receive further input signals. A signal at terminal 35 indicating that the memory is now available will result in a raising of circuit point 38 at some time prior to the time T0'. At time T0', it is assumed that a request signal is introduced to input terminal 31. One circuit delay later at time T1', a signal is introduced at terminal 30 and, at time T2', a signal appears at terminal 32. Since no signal has recirculated back to decondition point 38 at time T3', all of the appropriate latches 40, 42 and 44 will be set and thus all three input terminals will be competing in the scan window. The dropping of the signal level at circuit point 38, is essence, finalizes the competitors who will be allowed to compete in this particular scan window—in this case, all input signals benig competitors.

The signal which was originally introduced to terminal 31 will actually cause a deconditioning of circuit point 38 at time T3'. The ultimate winner would be the input signal at terminal 30 since it is to be the highest priority and it is to be noted that at time T3' the circuit functions have already been initiated to establish that the signal at 30 is the winner. For instance, the signal at 31 has resulted in tht deconditioning of AND 50 by the dropping of the signal from invert 57 at time T2', this having happened prior to the other input signals having travelled the signal paths to OR 56. However, the signal from terminal 66 will be initially raised since AND circuit 61 would be conditioned temporarily. Subsequently, the fact that scan latch 40 is set will result in the deconditioning of AND 61 and the dropping of the level at terminal 66 at approximately time T4'. However, OR 48 will continue to be conditioned since the output of AND 45 will bt providing an input thereto despite the loss of the output from AND 61 through the degating. Note that the output from ANDs 65 and 64 are both blocked by the presence of an output from latch 40 as well as the output from latch 42. Therefore, a signal level is never produced at output terminal 68. Once again it is the signal passage through the circuit including delay 54 which results in the final raising of an output from invert circuit 57 at slightly greater than T5' time to complete the conditioning of AND circuit 50. At a time slightly beyond T6', a signal will appear at terminal 58 which the memory control circuitry can interpret as indicating that a memory cycle is to be granted and that it is to be granted to the signal producing the input at terminal 30. As was the case for the T0 to T6 operation, the decision is based once again on the presence of a level at 46 and 58 concurrently.

In the prior art tiebreaking circuitry, the timing of the circuit signals had to be maintained so that it was possible for all levels of decision making to be completed before the final output decision could be indicated. That is, the tiebreaking circuitry had to remain inactive until the longest possible time for the highest priority device to produce a winning indication signal despite the fact that the input signal associated therewith was the last to appear. That is, if the circuitry of the present invention were not employed, it would be necessary to use timing signals which allowed for the circumstances wherein a lower priority device had initiated the closing of the scan window and would have to be of sufficient length to assume that the highest priority device was allowed to compete in the scan window and the circuitry was given sufficient time to stabilize to indicate that it was the winner. To put it another way, using tiebreaking circuitry somewhat analogous to the present invention, the prior art devices would have to wait a minimum of nine circuit delay times to ensure that the winning signal had produced an output indication of its identity. By use of the present invention, if the highest priority device is the device which initiates the timing cycle which is illustrated in the first part of FIG. 3, the time delay between the appearance of the initial signal and the actual awarding of priority (i.e.: the appearance of a signal 30 and the appearance of signals at both 46 and 58) is a maximum of five to six circuit delays as is illustrated in the first part of FIG. 3 between times T0 and T6 rather than nine circuit delays. Although it may appear that the use of circuitry in accordance with FIGS. 2 and 3 may result in producing an input signal at terminal 30 that could pre-empt any other device and prevent it from obtaining servicing, it should be appreciated from the teachings of the referenced application that the use of selected competition through the multiple level select system disclosed in the referenced application would permit every user an opportunity to obtain access to the common device at one time or another. That is, although 30 is shown as winning both cycles, ordinarily if a request had been produced by 31 and 32, these two would be permitted to compete with each other to the exclusion of 30 until both of them had been processed by use of the invention shown in the reference application.

Specific circuitry to perform the function of producing a start memory signal at terminal 58 has been shown but it is to be appreciated that other logic means within normal skill in the art can be used. For instance, signals appearing on terminals 46, 66 and 68 could be directly interpreted. After a time period approximately equal to the scan window following the initial signal appearing on 46, 66 or 68, a decision as to the winner can be immediately made if only one such output signal is still present. If two or more outputs are present, it would only be necessary to wait until the degating circuitry had resolved this apparent conflict to one output signal. By this arrangement, the particular delay circuits shown could be omitted entirely.

While the invention has been particularly shown and described with respect to the preferred embodiment thereof, it would be understood by those skilled in the art that many changes and modifications and the like in form and detail may be made therein without departing from the scope and spirit of this invention.

What is claimed is:

1. An access signalling device for determining priority in a predetermined order between a plurality of service request signals seeking access to a common unit comprising:

means responsive to the occurrence of any said plurality of service request signals for producing an output signal corresponding to any said occurrence, means producing a signal indicating the availability of said common unit to be accessed, means conditioned by the presence of said availability indicating signal for gating said service request signals to said output signal producing means, means independent of said common unit responsive to the first occurring said output signal to decondition said gating means, the time period between the occurrence of said first service request signal and the deconditioning of said gating means being a fixed predetermined time period during which said gating means is effective to gate subsequently occurring service request signals to said output signal producing means, output means responsive to said output signals for producing signals identifying the service request signals which are seeking access to said common unit, and means responsive to the occurrence of said output signal corresponding to the highest priority service request signal in said predetermined order for controlling said output means to terminate all said signals identifying service requests except the one corresponding to said highest priority service request signal.

2. An access signalling device in accordance with claim 1 which includes means responsive to said output signals for producing a signal indicating completion of said priority determination, and means conditioned by the occurrence of said signal identifying the highest priority service request and rendered effective by said signal indicating completion of said priority determination for producing a signal indicating that access may be initiated in accordance with the signal identifying the service request which is to have access to said common unit.

3. An access signalling device for determining priority in a predetermined order between a plurality of service request signals seeking access to a common unit comprising:

a plurality of storage elements each for producing an output signal indicating the receipt of a service request signal, means producing a signal indicating the availability of said common unit to be accessed, means conditioned by the presence of said availability indicating signal for gating said service request signals to corresponding ones of said storage elements, means independent of said common unit responsive to the output signal from said storage element receiving the first occurring service request signal to decondition said gating means, the time period between the occurrence of said first service request signal and the deconditioning of said gating means being a fixed predetermined time period during which said gating means is effective to gate subsequently occurring service request signals to corresponding ones of said storage elements, a plurality of output means responsive to said output signals from corresponding ones of said storage elements each producing a signal identifying the service request signal which is seeking access to said common unit, means responsive to said output signal corresponding to the highest priority service request signal in said predetermined order for deconditioning all said output means having a lower priority in said predetermined order to terminate all said signals identifying service requests except the one corresponding to said highest priority service request signal, means responsive to said output signals for producing a signal indicating completion of said priority determination, and means conditioned by the occurrence of said signal identifying the highest priority service request and rendered effective by said signal indicating completion of said priority determination for producing a signal indicating that access may be initiated in accordance with the signal identifying the service request which is to have access to said common unit.

4. An access signalling device in accordance with claim 3 wherein said completion signal indicating means includes a plurality of time delay means responsive to the output signals from corresponding ones of said storage elements each producing an output signal after a fixed period of delay, means responsive to said pluraality of time delay means for producing said signal indicating completion of said priority determination signal, and means responsive to said output deconditioning means for deconditioning all said time delay means having a lower priority in said predetermined order so that said signal indicating completion of said priority determination is produced in accordance with said highest priority service request.

References Cited

UNITED STATES PATENTS

| | | | |
|---|---|---|---|
| 3,283,306 | 11/1966 | Patrusky | 340—172.5 |
| 3,353,162 | 11/1967 | Richard | 340—172.5 |
| 3,395,394 | 7/1968 | Cottrell | 340—172.5 |
| 3,395,398 | 7/1968 | Klein | 340—172.5 |

PAUL J. HENON, Primary Examiner

S. P. CHIRLIN, Assistant Examiner